United States Patent
Griffin et al.

(10) Patent No.: US 12,524,693 B2
(45) Date of Patent: Jan. 13, 2026

(54) REAL TIME CONTRACT-BASED QUBIT REGISTRY

(71) Applicant: Red Hat, Inc., Raleigh, NC (US)

(72) Inventors: Leigh Griffin, Waterford (IE); Adam Piasecki, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 693 days.

(21) Appl. No.: 17/985,760

(22) Filed: Nov. 11, 2022

(65) Prior Publication Data

US 2024/0160974 A1    May 16, 2024

(51) Int. Cl.
*G06N 10/20* (2022.01)
*G06N 10/40* (2022.01)
*G06N 10/80* (2022.01)

(52) U.S. Cl.
CPC ............. *G06N 10/20* (2022.01); *G06N 10/40* (2022.01); *G06N 10/80* (2022.01)

(58) Field of Classification Search
CPC ........ G06N 10/00; G06N 10/20; G06N 10/40; G06N 10/60; G06N 10/70; G06N 10/80; G06N 5/01; G06F 3/016; G06F 17/16; G06F 9/546; G06F 9/5044; G06F 9/4881; G06F 3/011; H04L 41/12; H04L 63/0414; G06Q 30/08; G08B 6/00
See application file for complete search history.

(56) References Cited

U.S. PATENT DOCUMENTS

| | | | |
|---|---|---|---|
| 11,379,752 B1 | 7/2022 | Griffin et al. | |
| 12,165,007 B2 * | 12/2024 | Kim | G06N 10/00 |
| 12,299,535 B2 * | 5/2025 | Meijer | G06N 10/40 |
| 12,387,121 B2 * | 8/2025 | Resch | G06N 10/60 |

(Continued)

FOREIGN PATENT DOCUMENTS

| | | | | |
|---|---|---|---|---|
| CA | 3022037 C | * | 9/2021 | G06N 5/01 |
| CA | 3015034 C | * | 6/2022 | G06N 5/01 |

(Continued)

OTHER PUBLICATIONS

Finigan et al. "Qubit Allocation for Noisy Intermediate-Scale Quantum Computers" (Oct. 22, 2018), arXiv:1810.08291v1 [quant-ph], https://doi.org/10.48550/arXiv.1810.08291 (6 pages).

(Continued)

*Primary Examiner* — Steven P Sax
(74) *Attorney, Agent, or Firm* — Womble Bond Dickinson (US) LLP

(57) ABSTRACT

Embodiments of the present disclosure provide techniques for implementing a qubit registry that is enhanced to gate the allocation of qubits using a contract (e.g., a smart contract). The qubit registry may obtain quantum system metadata indicating a current capability of a quantum machine comprising a plurality of qubits and generate one or more contracts based on the quantum system metadata. Each of the one or more contracts include service criteria and usage restrictions. In response to receiving a request from a service to allocate a set of qubits of the plurality of qubits to the service, the qubit registry may compare the service to a first contract of the one or more contracts. In response to determining that the service meets the service criteria of the first contract, allocating the set of qubits to the service with the usage restrictions of the first contract.

15 Claims, 6 Drawing Sheets

(56) References Cited

U.S. PATENT DOCUMENTS

| | | | |
|---|---|---|---|
| 12,417,396 B2 * | 9/2025 | Huang | G06N 10/20 |
| 2021/0334237 A1 | 10/2021 | Coady et al. | |
| 2021/0374583 A1 | 12/2021 | Griffin et al. | |
| 2022/0027323 A1 | 1/2022 | Coady et al. | |
| 2022/0269965 A1 | 8/2022 | Griffin et al. | |
| 2022/0308966 A1 | 9/2022 | Coady et al. | |
| 2022/0382605 A1 * | 12/2022 | Griffin | G06F 9/546 |
| 2023/0023333 A1 * | 1/2023 | Naveh | G06F 3/016 |
| 2023/0032530 A1 * | 2/2023 | Naveh | G06N 10/80 |
| 2023/0368060 A1 * | 11/2023 | Lewis | G06N 10/40 |
| 2024/0078457 A1 * | 3/2024 | Stockert | H04L 41/12 |
| 2024/0289665 A1 * | 8/2024 | Pichler | G06N 10/20 |
| 2024/0338584 A1 * | 10/2024 | Boothby | H10N 60/12 |
| 2024/0338590 A1 * | 10/2024 | Zimborás | G06F 17/11 |
| 2024/0363738 A1 * | 10/2024 | Hansen | H10D 48/383 |
| 2025/0131316 A1 * | 4/2025 | Künne | G06N 10/70 |

FOREIGN PATENT DOCUMENTS

| | | | | |
|---|---|---|---|---|
| CA | 3104119 C | * | 8/2023 | H04L 63/0414 |
| CA | 3094740 C | * | 12/2023 | G06N 10/20 |
| WO | WO-2020072819 A1 | * | 4/2020 | G06Q 30/08 |
| WO | WO-2022118291 A1 | * | 6/2022 | G06N 10/00 |
| WO | WO-2022231846 A1 | * | 11/2022 | G06N 10/80 |
| WO | WO-2023084425 A1 | * | 5/2023 | G06F 17/16 |

OTHER PUBLICATIONS

Kaewpuang et al. "Stochastic Qubit Resource Allocation for Quantum Cloud Computing" (Oct. 22, 2022), arXiv:2210.12343v1 [quant-ph], https://doi.org/10.48550/arXiv.2210.12343 (8 pages).

* cited by examiner

US 12,524,693 B2

REAL TIME CONTRACT-BASED QUBIT REGISTRY

TECHNICAL FIELD

Aspects of the present disclosure relate to an enhanced qubit registry that can use contract-based techniques to manage/gate allocation of qubits.

BACKGROUND

A container-orchestration system may automate many of the manual processes involved in deploying, managing, and scaling containerized applications. For example, a container-orchestration system for developing and running containerized applications may allow applications and the data centers that support them to expand from just a few machines and applications to thousands of machines that serve millions of clients. Services, such as a containerized application for example, are deployed within a node or group of nodes (hereinafter, "cluster") of a container-orchestration system (e.g., Redhat™ OpenShift™ module on a Kubernetes® platform) and may depend on other services/libraries and their respective resources that are deployed within and outside the cluster in order to execute. For example, a web service may depend on a resource such as a database, in order to be able to persist its data. The services/libraries that a service depends on may be referred to herein as dependencies.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
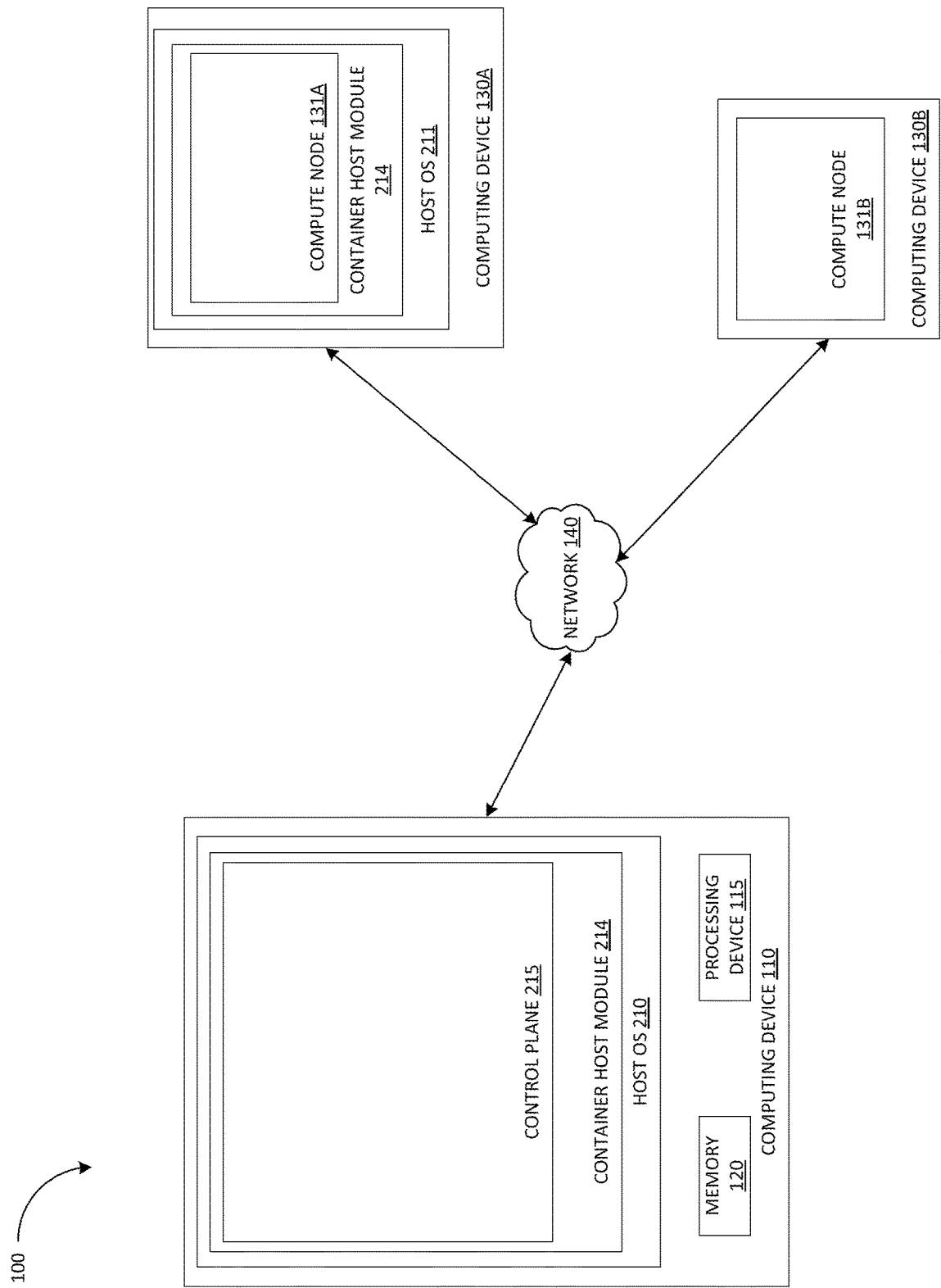
FIG. 1 is a block diagram that illustrates an example system, in accordance with some embodiments of the present disclosure.

Gating mechanisms (also referred to as gates) are often used throughout software development and execution for various purposes. For example, the software development lifecycle may involve a number of gates that each provide precise tests and approvals to ensure a stable production environment. Each gate may comprise a set of tests/conditions that must be passed before the software can move to the next phase. Examples of such tests include unit tests, functional tests, integration tests, penetration tests, and acceptance tests. Such tests/conditions can often be implemented as a contract. One example is a smart contract, which is a program that is stored on a ledger (e.g., blockchain) and executes when predetermined conditions are met. Smart contracts are typically used to automate the execution of an agreement so that all participants can be immediately certain of the outcome, without any intermediary's involvement. Smart contracts can also automate a workflow, triggering a subsequent action when the predetermined conditions are met. Smart contracts are also immutable and can serve as a source of truth for various auditing purposes.

Quantum computing is a type of computation that harnesses the collective properties of quantum states, such as superposition, interference, and entanglement, to perform calculations. The devices that perform quantum computations are known as quantum computers. Although there are different types of quantum computers, one of the most widely used is the quantum circuit, based on the quantum bit (also referred to as a "qubit"). A qubit can be in a 1 or 0 quantum state, or in a superposition of the 1 and 0 states. When it is measured, however, it is always 0 or 1 and the probability of either outcome depends on the qubit's quantum state immediately prior to measurement. Using non-quantum hardware, a search problem with a search space of N items requires examination of the search space on the order of N times to find the item being sought. However, quantum hardware may solve the search problem after examining the search space approximately $\sqrt{N}$ times. Although classical cluster management services can discover classical machines/computing devices and create clusters using classical hardware, they are unable to support creation of clusters that use quantum hardware.

In the current NISQ era, qubits are fragile resources and in a shared environment where multiple services must share the same finite pool of qubits, effective management and gating of qubit allocation is important to maintain a system that can run quantum services efficiently. For example, services that are misconfigured may cause noise and errors that put stress on a quantum machine. Further, if a service is misconfigured or does not execute properly, it may not release the qubits it has been allocated upon completion, thereby denying access to those qubits for other services. Certain services can also misuse qubits, e.g., by requesting all available qubits of a quantum system and starving other services of the qubits they need to execute. In addition, it is important to ensure that the right services get access to qubits. Currently, there are no real barriers to reserving qubits outside of availability. Thus, in a quantum machine with 100 qubits, a single service can reserve all 100 qubits via a qubit registry.

The present disclosure addresses the above-noted and other deficiencies by providing a qubit registry that is enhanced to gate the allocation of qubits using a contract (e.g., a smart contract). The qubit registry may analyze quantum system metadata of the quantum machine to create a contract having service criteria that a service requesting an allocation of qubits must meet before the service can be granted access to the quantum machine and allocated the requested qubits. The contract may also include usage restrictions that govern the use of the allocated qubits/ execution of the service once the qubits have been allocated. The service criteria may include a set of conditions (i.e., limitations on the service) that the service must meet including limits on the number of qubits being requested, limits on error correction software being used by the service, limitations on the noise impact of the service, limitations on the heat impact of the service, and limitations on the quantum phenomena that can be used by the service, among others. The qubit registry may obtain and analyze quantum system metadata at regular intervals to ensure that it always maintains an accurate picture of the current capabilities of the quantum machine. As a result, the service criteria and usage restrictions of the contract may comprise real-time ("just-in-time") limitations that reflect the current capabilities of the quantum machine 132 (as indicated by the quantum system metadata) and can be updated by the qubit registry 134 in response to changes in the capabilities of the quantum machine 132.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device 110 and 130 may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

In some embodiments, each of the computing devices 110 and 130 may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130A respectively, as discussed in more detail below. The host OS of a computing device may manage the execution of other components (e.g., software, applications, etc.) and/or may manage access to the hardware (e.g., processors, memory, storage devices etc.) of the computing device.

In some embodiments, a container orchestration engine 214 (referred to herein as container host 214), such as the Redhat™ OpenShift™ module, may execute on the host OS of each of the computing device 110 and the computing devices 130, as discussed in further detail herein. The container host 214 may be a platform for developing and running containerized applications and may allow applications and the data centers that support them to expand from just a few machines and applications to thousands of machines that serve millions of clients. The container host 214 may provide an image-based deployment module for creating containers and may store one or more image files for creating container instances. The container host 214 may include a storage driver (not shown), such as OverlayFS, to manage the contents of an image file including the read only and writable layers of the image file.

A typical deployment of the container host 214 may include a control plane 215 and a cluster of compute nodes 131, including compute nodes 131A and 131B (also referred to as compute machines). The compute nodes 131 may run the aspects of the container host 214 that are needed to launch and manage containers, pods, and other objects. For example, a compute node may be a physical server that provides the processing capabilities required for running containers in the environment. A compute node may also be implemented as a virtual server, logical container, or GPU, for example.

Figure 2A:
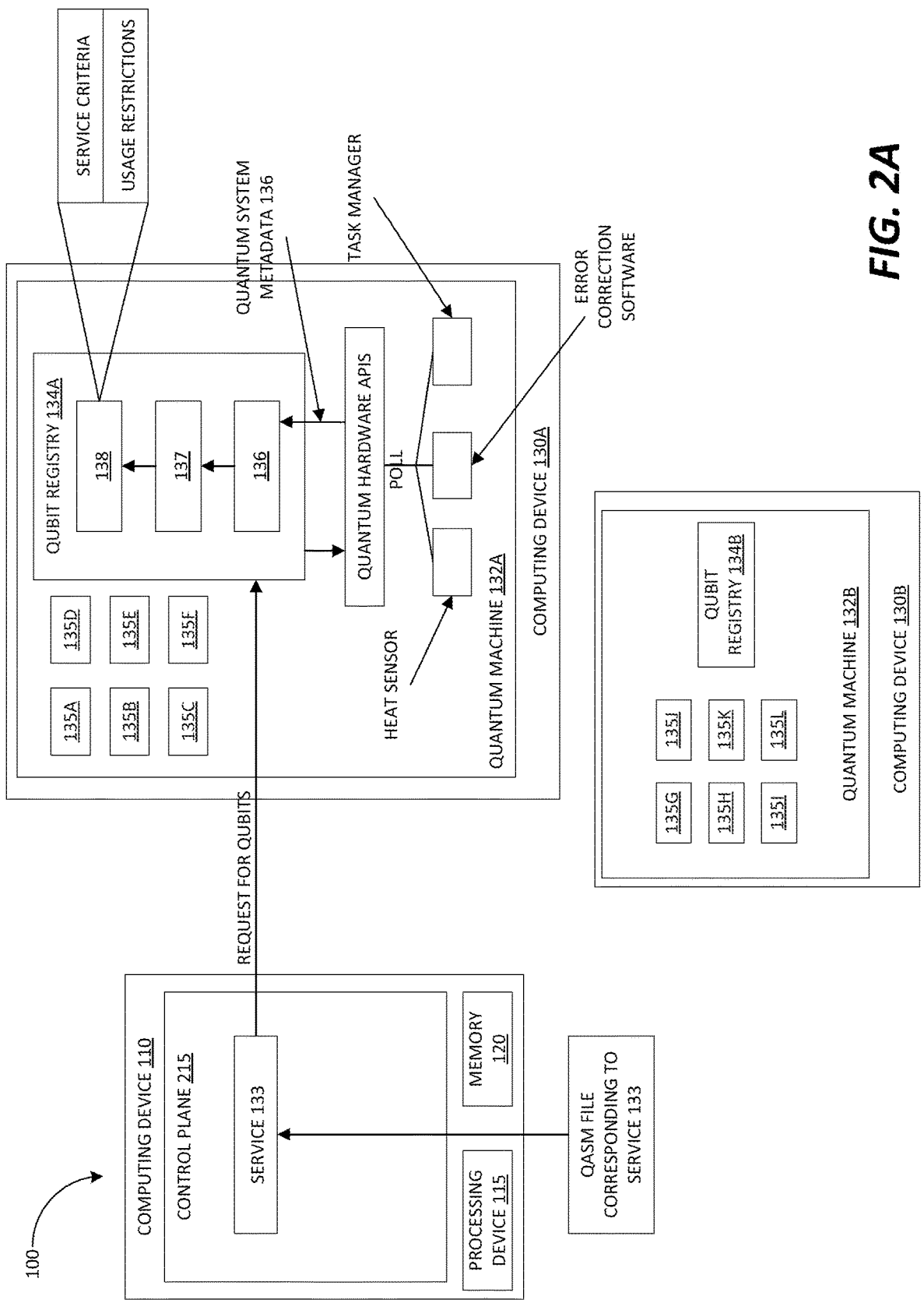
FIG. 2A is a block diagram that illustrates an example system, in accordance with some embodiments of the present disclosure.

Referring to FIG. 2A, in some embodiments each of the computing devices 130 may comprise a quantum machine 132 that operates in a quantum environment but can operate using classical computing principles or quantum computing principles. When using quantum computing principles, the quantum machine 132 performs computations that utilize quantum-mechanical phenomena, such as superposition and entanglement. The quantum machine 132 may operate under certain environmental conditions, such as at or near 0° Kelvin. When using classical computing principles, the quantum machine 132 utilizes binary digits that have a value of either 1 or 0.

Each quantum machine 132 may implement a set of qubits 135 and may include a respective qubit registry 134. While solely for purposes of illustration each quantum machine 132 is described as having only six qubits 135, it is apparent that each quantum machine 132 may have hundreds or thousands of qubits 135 in some implementations. Each qubit registry 134 may be a program executing within the respective quantum machine 132 that services (e.g., services that clients wish to deploy) may interface with in order to request access to qubits 135 for execution. A qubit registry 134 may maintain information on the total number of qubits 135 implemented by the respective quantum machine 132 and the total number of qubits 135 that are currently available for allocation. A qubit registry 134 may also maintain a task manager (also referred to as a services log—not shown) that indicates which qubits 135 are currently allocated and the services they are currently allocated to. The task manager may also include for each of the qubits 135 of its respective quantum machine 132, address information that indicates how to refer to the qubit 135 from an addressing perspective.

As discussed hereinabove, qubits are fragile/finite resources. In a shared environment where multiple services must share the same finite pool of qubits, effective management and gating of qubit allocation is important to maintain a system that can run quantum services efficiently. Embodiments of the present disclosure may utilize a qubit registry that is enhanced to gate the allocation of qubits using a contract (e.g., a smart contract) that is based on the current capabilities of a respective quantum machine.

Figure 2B:
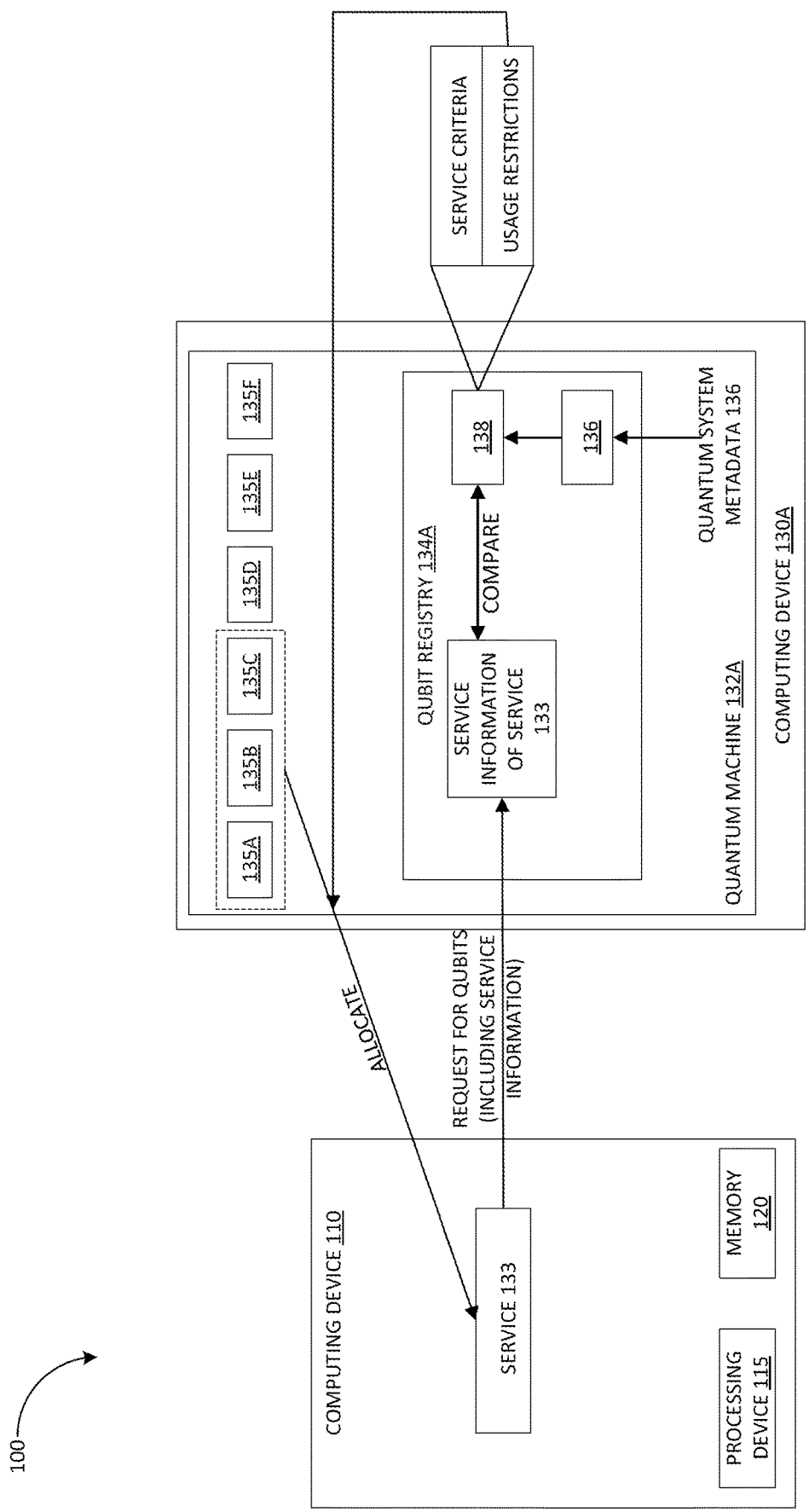
FIG. 2B is a block diagram that illustrates an example system, in accordance with some embodiments of the present disclosure.

Referring to FIGS. 2A and 2B, the qubit registry 134A may obtain quantum system metadata 136 that indicates the current capabilities of the quantum machine 132A. The qubit registry 134A may use quantum hardware APIs to poll various components of the quantum machine 134A such as e.g., task managers, heat sensors, and memory (e.g., to determine types of error correction software supported by the quantum machine 132A), among other components to obtain the quantum system metadata 136. The quantum system metadata 136 may include a number of qubits 135A-F available to allocate, a coherence level of the quantum machine 132A, a current temperature of the quantum machine 132A, T1 times, T2 times, quantum communication pathways provided by the quantum machine 132A, quantum phenomena provided by the quantum machine 132A, and types of error correction software supported by the quantum machine 132A. The quantum system metadata 136 may further include a real-time state of each qubit 135 that indicates whether the qubit 135 is in an entangled state, is in superposition, etc. The qubit registry 134A may obtain quantum system metadata 136 as discussed hereinabove at any appropriate interval to ensure that it maintains a real-time picture of the quantum machine 132A's capabilities.

The qubit registry 134A may include a contract generation module 137 which may analyze the quantum system metadata 136 and generate a contract 138 based thereon. The contract 138 may include service criteria comprising a set of limitations (not shown) on services requesting qubits 135, the set of limitations being based on the current capabilities of the quantum machine 132A (as indicated by the quantum system metadata 136). The service criteria may include limitations on e.g., the number of qubits 135 a service can request, the types of error correction software that can be used by a service, the quantum phenomena (e.g., quantum entanglement, quantum teleportation) that a service can utilize/quantum state(s) that a service can put qubits 135 in, the noise impact of a service, and the heat impact of a service, among others. The qubit registry 134A may tailor each limitation of the service criteria so that services that meet the service criteria will not exceed the current capabilities of the quantum machine 134A while executing. A service 133 requesting allocation of qubits 135 must meet each limitation of the service criteria of the contract 138 before the service 133 can be granted access to the quantum machine 132 and allocated the requested qubits 135. It should be noted that different qubits 135 can be made of different materials e.g., silicon-based, photon-based etc. and in order for execution of some services to be optimized, those services must execute on qubits 135 made from certain materials. As a result, in some embodiments, the qubit registry 134 may generate limitations that restrict certain services (based on e.g., their classification) to only qubits 135 made from particular materials. For example, any service that needs to dynamically request more resources for additional storage or computational needs and thus requires more qubits may be subject to a limitation requiring the use of qubits of a certain type of material.

In some embodiments, the contract 138 may also include usage restrictions that govern how a service may use the requested qubits 135 once they have been allocated to the service. The usage restrictions may include restrictions on e.g., the amount of time the requested qubits 135 will be allocated to the service, a number of times a service can be executed using the requested qubits 135, and what quantum state(s) (as well as a time/execution limits corresponding thereto) each allocated qubit 135 can be put in (assuming the quantum phenomena associated with that quantum state is not barred by a limitation of the service criteria). For example, a first usage restriction may specify that a service may be allocated the requested 4 qubits for the next hour or for the next 3 executions (whichever comes first). A second usage restriction may specify a prohibition on using more than 3 of the 4 allocated qubits 135 in teleportation, while a third usage restriction may specify a prohibition on using more than 2 of the 4 allocated qubits 135 in quantum entanglement. Usage restrictions enable the qubit registry 134 to protect the quantum machine 132 from unnecessary usage of qubits as a result of e.g., services/programs that are malformed and thus don't release allocated qubits 135 upon finishing execution. As with the service criteria, the qubit registry 134A may tailor each usage restriction so that services that are allocated qubits 135 will not exceed the current capabilities of the quantum machine 134A while executing.

Each service may include a program descriptor that includes service information such as a number of qubits 135 required by the service, what types of error correction software the service uses, what quantum phenomena the service requires, and a classification of the service, among other information. With respect to the classification of the service, in some embodiments the classification may be part of the service information (e.g., a QASM file corresponding to the service may describe what the intentions of the service are). In other embodiments, the qubit registry 134A may predetermine a set of different classifications and classify the service upon receiving a request for qubits 135 from the service. The qubit registry 134A may also determine certain additional aspects of the service information based on the service information provided by the program descriptor. Examples of additional aspects of the service information may include e.g., a heat impact of the service and a noise impact of the service. In some embodiments, the heat and noise impact of the service may be determined by the qubit registry from the service information (e.g., the corresponding QASM file of the service may be annotated with heat and noise impact data based on historical executions of the service). In other embodiments, the heat and noise impact of the service can also be obtained from appropriate services (e.g., error correction or heat monitoring services) to create a metric that shows the impact that previous executions of the service had on the quantum machine 132A. Once the contract 138 has been generated, if a service 133 requests qubits 135 from the quantum machine 132, the qubit registry 134 may compare the program descriptor of the service to the service criteria of the contract 138 to determine if the service 133 meets each limitation of the service criteria. If the qubit registry 134 determines that the service 133 meets all of the limitations of the service criteria, then it may grant the requested qubits 135 to the service 133 for execution. If the contract 138 includes usage restrictions as discussed above, the qubit registry 134 may issue the requested qubits 135 to the service and enforce the usage restrictions included in the contract 138.

The contract 138 (and more specifically, the service criteria and usage restrictions therein) may comprise real-time ("just-in-time") limitations/restrictions that reflect the current capabilities of the quantum machine 132 (as indicated by the quantum system metadata 136) and can be updated by the qubit registry 134 in response to changes in the capabilities of the quantum machine 132. Thus, the qubit registry 134A may use the quantum hardware APIs to poll the various components of the quantum machine 134A at regular intervals to thereby obtain quantum system metadata 136 regularly and ensure that it maintains a real-time picture of the quantum machine 132A's capabilities. As the capabilities of the quantum machine 132A change (e.g., due to services completing execution and releasing their qubits or additional services being allocated qubits), the qubit registry 134A may update the limitations and usage restrictions of the contract 138.

Figure 3:
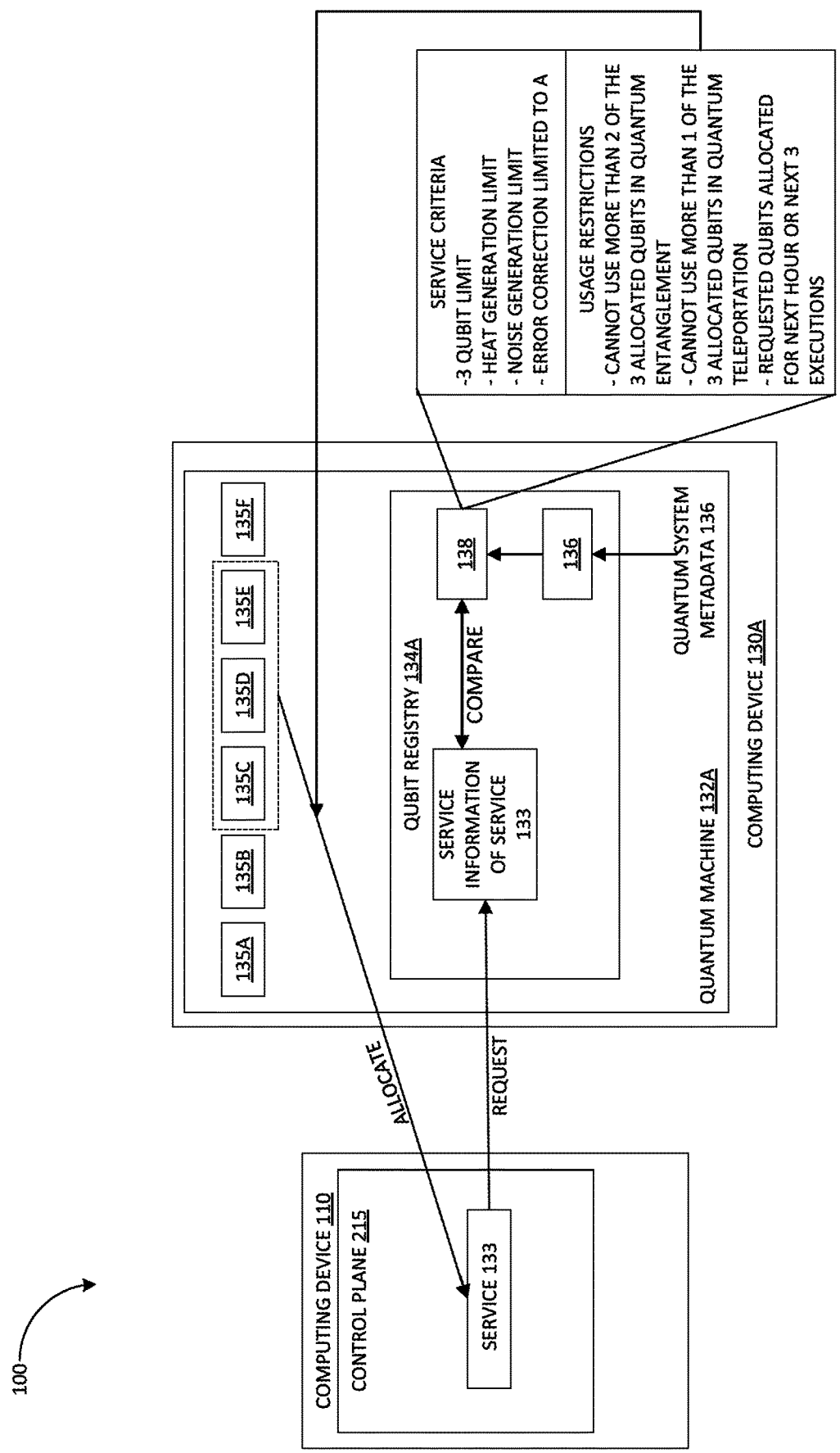
FIG. 3 is a block diagram that illustrates an example system, in accordance with some embodiments of the present disclosure.

FIG. 3 illustrates the system 100 illustrated in FIGS. 2A and 2B implementing an example contract-based qubit gating technique, in accordance with some embodiments of the present disclosure. The qubit registry 134A may obtain quantum system metadata 136 as described hereinabove. Based on the quantum system metadata 136, the qubit registry 134A may determine that qubits 135C-F are available to allocate, the quantum machine 132A is approaching a temperature threshold and a coherence threshold, and that error correction software types A-C are supported by the quantum machine 132A. Because the quantum machine 134A is reaching its coherence and temperature thresholds, the qubit registry 134A may generate a contract 138 having service criteria including a 3-qubit limit on the number of qubits 135 that can be requested as well as limitations on the amount of heat and the amount of noise that can be generated by a service requesting qubits 135. The qubit registry 134A may base the limitations on the amount of heat and the amount of noise that can be generated by a requesting service on the current levels of heat and noise as well as the maximum heat and noise thresholds of the quantum machine 132A. In addition, because error correction software type C is computationally intensive and generates significant heat and noise, the contract 138 may also include a limit requiring the use of error correction software A (or requiring the use of error correction software A over error correction software B if given the choice between the two) which provides better resiliency and has lower noise and heat thresholds.

The qubit registry 134A may also determine that because the quantum machine 132A is approaching a temperature threshold and a coherence threshold, usage restrictions on any requested qubits must be generated. In the example of FIG. 3, the qubit registry 134A may determine that placement of all of the requested qubits 135 in an entanglement state may result in execution of a service exceeding the heat and noise thresholds and thus may generate a usage restriction specifying a prohibition on using more than 2 of the maximum 3 allocated qubits 135 in quantum entanglement. Similarly, the qubit registry 134A may generate a second usage restriction specifying a prohibition on using more than 1 of the maximum 3 allocated qubits 135 in quantum teleportation. In addition, the qubit registry 134A may generate a third usage restriction specifying that a requesting service 133 may be allocated the requested qubits for the next hour or for the next 3 executions (whichever comes first).

Upon receiving a request for qubits from service 133, the qubit registry 134A may compare the program descriptor (and more specifically, the service information thereof) of the service 133 to the contract 138. The service information may indicate that service 133 is requesting 3 qubits 135, and that the service 133 supports error correction software types A and B. The program descriptor may also indicate a type of the service 133 (e.g., quantum cryptography service), based on which the qubit registry 134A may determine the amount of heat and noise that the service 133 will generate. The qubit registry 134A may determine that the service 133 meets all of the service limitations of the contract 138 and allocate the 3 requested qubits as well as enforce the usage restrictions while the service 133 is using the allocated qubits to execute.

In some embodiments, the qubit registry 134 may generate multiple contracts, each with different service criteria and usage restrictions that are based on (in addition to the quantum system metadata 136) any of a number of factors regarding services including e.g., material type of qubits required, error correction software required, and classification of the service, among others. In some embodiments, the qubit registry 134A may pre-generate each of the multiple contracts and maintain a collection of "stock" contracts. In other embodiments, the qubit registry 134A may generate each of the multiple contracts based on the service information of one or more services that have actually requested qubits as well as the capabilities of the quantum machine 134A at the time of such requests. For example, different qubits 135 can be made of different material types as discussed hereinabove. Because qubits 135 made of different materials will have different performance characteristics, the qubit registry 134 may generate a different contract for each different material type among the qubits 135. Indeed, the performance (e.g., heat generation, noise generation) of qubits 135 of a first material when used for certain functions and in certain quantum states may be significantly different from the performance of qubits of a second material when used for the same functions and in the same quantum states. Thus, a service implemented on qubits 135 made of a first material may exceed the current capabilities of the quantum machine 132A, while the same service implemented on qubits 135 made of a second material may not exceed the current capabilities of the quantum machine 132A. Similarly, while allocation of a certain number of qubits 135 of a first material type for a particular service may exceed the capabilities of the quantum machine 132A, allocation of the same number qubits 135 of a second material type for that particular service may not. As a result, the qubit registry 134A may generate a different contract for each different material type among the qubits 135 based on the quantum system metadata 136 and the properties of the material type. When a service requests an allocation of qubits 135, the qubit registry 134A may compare the service to each contract to determine whether the service meets the requirements of any of the contracts. In some embodiments, when a service must be optimized by allocating qubits 135 of a particular material, the qubit registry 134A may only compare the service to the contract generated for on that particular material.

In another example, the qubit registry 134A may also generate different contracts for different service classifications. E.g., if service is classified as a storage application, it may use qubits 135 for storage purposes that are not computationally intensive and result in relatively low levels of heat and noise generation. Thus, the contract generated for services classified as storage applications may have more relaxed limitations/usage restrictions compared to a contract generated for services classified as quantum cryptography that requires the use of qubits 135 in a more computationally intensive manner (e.g., in entanglement or superposition). In addition, services may also (or alternatively) be classified by computational intensity (e.g., high, medium, low) as opposed to type. For example, if a service requesting qubits 135 wishes to use them for entanglement or superposition, then it may be classified as high computational intensity and a contract with stricter service criteria/usage restrictions may be generated/applied. Thus, the qubit registry 134A may generate a different contract for each different service classification based on the quantum system metadata 136 and the properties of the service classification.

Once a service meets the service criteria of a contract 138, the qubit registry 134A can issue that contract 138 for numerous other services. The qubit registry 134A can also implement a ledger of services that can be interrogated by a user to access information such as: which services have been deployed by which users, the number of qubits resources currently being consumed by each service, a noise impact of each service, error correction software being used by each service, heat impact of each service, and usage restrictions on each service, among others.

In some embodiments, each time a service executes on the quantum machine 132A after meeting the requirements of a particular contract, the qubit registry 134A may create and store a record of the execution. The qubit registry 134A may utilize its service ledger to store each of these records of execution in association with the particular contract. Over time, as a service continues to execute successfully, a contractual history of successful executions is built up for the service. This contractual history can be used to increase the confidence in the service. For example, when a different qubit registry 134B (of quantum machine 132B) wishes to execute the service for the first time, it may query the service ledger of qubit registry 134A to obtain the service's execution history and determine that the service has a history of successful executions when meeting the set of service limitations and usage restrictions of the particular contract. Because of the immutable element of smart contracts, the execution history of the service may be treated as a source of truth and can be relied on by the qubit registry 134B when determining whether to execute the service based on meeting the set of service limitations and usage restrictions of the particular contract.

Figure 4:
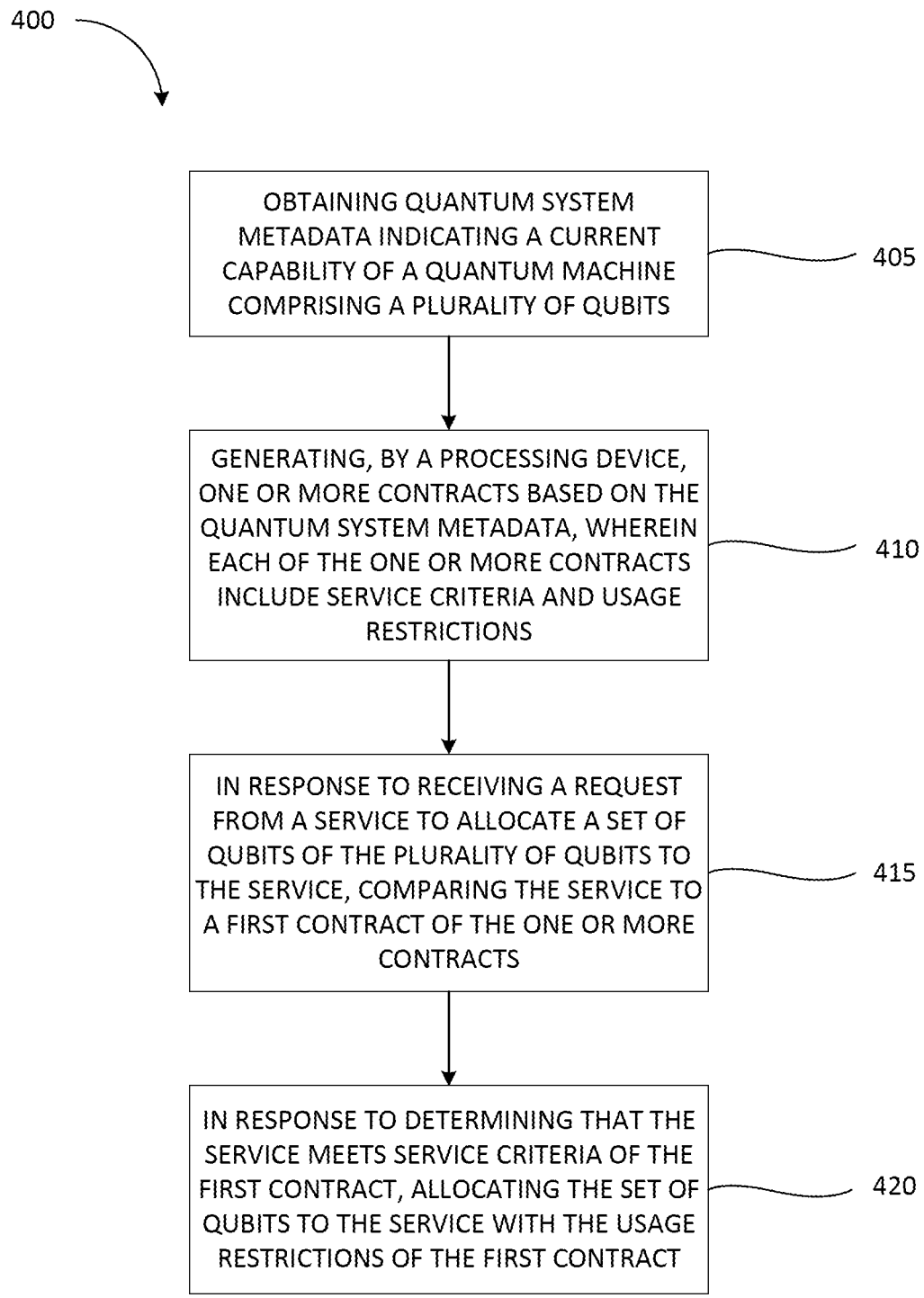
FIG. 4 is a flow diagram of a method of implementing a qubit registry that is enhanced to gate the allocation of qubits using a contract, in accordance with some embodiments of the present disclosure.

FIG. 4 is a flow diagram of a method 400 for implementing a qubit registry that is enhanced to gate the allocation of qubits using a contract e.g., a smart contract, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by e.g., computing devices 110 and 130A as illustrated in FIGS. 2 and 3.

Referring simultaneously to FIG. 2, at block 405, the qubit registry 134A may obtain quantum system metadata 136 that indicates the current capabilities of the quantum machine 132A in order to generate a contract 138. More specifically, the qubit registry 134A may use quantum hardware APIs to poll various components of the quantum machine 134A such as e.g., task managers, heat sensors, and memory (e.g., to determine types of error correction software supported by the quantum machine 132A), among other components to obtain the quantum system metadata 136. The quantum system metadata 136 may include a number of qubits 135A-F available to allocate, a coherence level of the quantum machine 132A, a current temperature of the quantum machine 132A, T1 times, T2 times, quantum communication pathways provided by the quantum machine 132A, quantum phenomena provided by the quantum machine 132A, and types of error correction software supported by the quantum machine 132A. The quantum system metadata 136 may further include a real-time state of each qubit 135 that indicates whether the qubit 135 is in an entangled state, is in superposition, etc. The qubit registry 134A may obtain quantum system metadata 136 as discussed hereinabove at any appropriate interval to ensure that it maintains a real-time picture of the quantum machine 132A's capabilities.

The qubit registry 134A may include a contract generation module 137, and at block 410, the contract generation module 137 may analyze the quantum system metadata 136 and generate a contract 138 based thereon. The contract 138 may include service criteria comprising a set of limitations (not shown) on services requesting qubits 135, the set of limitations being based on the current capabilities of the quantum machine 132A (as indicated by the quantum system metadata 136). The service criteria may include limitations on e.g., the number of qubits 135 a service can request, the types of error correction software that can be used by a service, the quantum phenomena (e.g., quantum entanglement, quantum teleportation) that a service can utilize/state (s) that a service can put qubits 135 in, the noise impact of a service, and the heat impact of a service, among others. The qubit registry 134A may tailor each limitation of the service criteria so that services that meet the service criteria will not exceed the current capabilities of the quantum machine 134A while executing. A service 133 requesting allocation of qubits 135 must meet each limitation of the service criteria of the contract 138 before the service 133 can be granted access to the quantum machine 132 and allocated the requested qubits 135. In addition, different qubits 135 can be made of different materials e.g., silicon-based, photon-based etc. In some cases, in order for execution of a service to be optimized, it is important to offer qubits 135 made from certain materials. As a result, in these scenarios the qubit registry 134 may generate limitations that restrict certain services to only qubits 135 made from particular materials. For example, any service that needs to dynamically request more resources for additional storage or computational needs and thus requires more qubits may be subject to a limitation requiring the use of qubits of a certain type of material.

In some embodiments, the contract 138 may also include usage restrictions that govern how the service 133 may use the requested qubits 135 once they have been allocated to the service 133. The usage restrictions may include restrictions on the amount of time the requested qubits 135 will be allocated to the service 133, a number of times the service 133 can be executed using the requested qubits 135, and what state(s) (as well as a time/execution limits corresponding thereto) each allocated qubit 135 can be put in (assuming the quantum phenomena associated with that state is not barred by a limitation of the service criteria). For example, a first usage restriction may specify that the service 133 may be allocated the requested 4 qubits for the next hour or for the next 3 executions (whichever comes first). A second usage restriction may specify a prohibition on using more than 3 of the 4 allocated qubits 135 in teleportation and a prohibition on using more than 2 of the 4 allocated qubits 135 in entanglement etc. Usage restrictions enable the qubit registry 134 to protect the quantum machine 132 from unnecessary usage of qubits as a result of e.g., programs that are malformed and thus don't release qubits upon finishing execution. As with the service criteria, the qubit registry 134A may tailor each usage restriction so that services that are allocated qubits 135 will not exceed the current capabilities of the quantum machine 134A while executing.

The service criteria may comprise real-time ("just-in-time") limitations that reflect the current capabilities of the quantum machine 132 (as indicated by the quantum system metadata 136) and can be updated by the qubit registry 134 in response to changes in the capabilities of the quantum machine 132. Thus, the qubit registry 134A may use the quantum hardware APIs to poll the various components of the quantum machine 134A at regular intervals to thereby obtain quantum system metadata 136 regularly and ensure that it maintains a real-time picture of the quantum machine 132A's capabilities. As the capabilities of the quantum machine 132A change (e.g., due to services completing execution and releasing their qubits or additional services being allocated qubits), the qubit registry 134A may update the limitations and usage restrictions of the contract 138.

Each service may include a program descriptor that includes service information such as a number of qubits 135 required by the service, what types of error correction software the service uses, what quantum phenomena the service requires, and a classification of the service, among other information. With respect to the classification of the service, in some embodiments the classification may be part of the service information (e.g., a QASM file corresponding to the service may describe what the intentions of the service are). In other embodiments, the qubit registry 134A may predetermine a set of different classifications and classify the service upon receiving a request for qubits 135 from the service. The qubit registry 134A may also determine certain additional aspects of the service information based on the service information provided by the program descriptor. Examples of additional aspects of the service information may include e.g., a heat impact of the service and a noise impact of the service. At block 415, anytime a service requests qubits 135 from the quantum machine 132, the qubit registry 134 may compare the program descriptor of the service to the service criteria of the contract 138 to determine if the service meets each limitation of the service criteria.

At block 420, if the qubit registry 134 meets all of the limitations of the service criteria, then it may grant the requested qubits 135 to the service for execution. If the contract 138 includes usage restrictions as discussed above, the qubit registry 134 may issue the requested qubits 135 to the service and enforce the usage restrictions included in the contract 138.

In some embodiments, the qubit registry 134 may generate multiple contracts, each with different service criteria and usage restrictions that are based on (in addition to the quantum system metadata 136) any of a number of factors regarding services including e.g., material type of qubits required, error correction software required, and classification of the service, among others. In some embodiments, the qubit registry 134A may pre-generate each of the multiple contracts and maintain a collection of "stock" contracts. In other embodiments, the qubit registry 134A may generate each of the multiple contracts based on the service information of one or more services that have actually requested qubits as well as the capabilities of the quantum machine 134A at the time of such requests. For example, different qubits 135 can be made of different material types as discussed hereinabove. Because qubits 135 made of different materials will have different performance characteristics, the qubit registry 134 may generate a different contract for each different material type among the qubits 135. Indeed, the performance (e.g., heat generation, noise generation) of qubits 135 of a first material when used for certain functions and in certain quantum states may be significantly different from the performance of qubits of a second material when used for the same functions and in the same quantum states. Thus, a service implemented on qubits 135 made of a first material may exceed the current capabilities of the quantum machine 132A, while the same service implemented on qubits 135 made of a second material may not exceed the current capabilities of the quantum machine 132A. Similarly, while allocation of a certain number of qubits 135 of a first material type for a particular service may exceed the capabilities of the quantum machine 132A, allocation of the same number qubits 135 of a second material type for that particular service may not. As a result, the qubit registry 134A may generate a different contract for each different material type among the qubits 135 based on the quantum system metadata 136 and the properties of the material type. When a service requests an allocation of qubits 135, the qubit registry 134A may compare the service to each contract to determine whether the service meets the requirements of any of the contracts. In some embodiments, when a service must be optimized by allocating qubits 135 of a particular material, the qubit registry 134A may only compare the service to the contract generated for on that particular material.

In another example, the qubit registry 134A may also generate different contracts for different service classifications. E.g., if service is classified as a storage application, it may use qubits 135 for storage purposes that are not computationally intensive and result in relatively low levels of heat and noise generation. Thus, the contract generated for services classified as storage applications may have more relaxed limitations/usage restrictions compared to a contract generated for services classified as quantum cryptography that requires the use of qubits 135 in a more computationally intensive manner (e.g., in entanglement or superposition). In addition, services may also (or alternatively) be classified by computational intensity (e.g., high, medium, low) as opposed to type. For example, if a service requesting qubits 135 wishes to use them for entanglement or superposition, then it may be classified as high computational intensity and a contract with stricter service criteria/usage restrictions may be generated/applied. Thus, the qubit registry 134A may generate a different contract for each different service classification based on the quantum system metadata 136 and the properties of the service classification.

Figure 5:
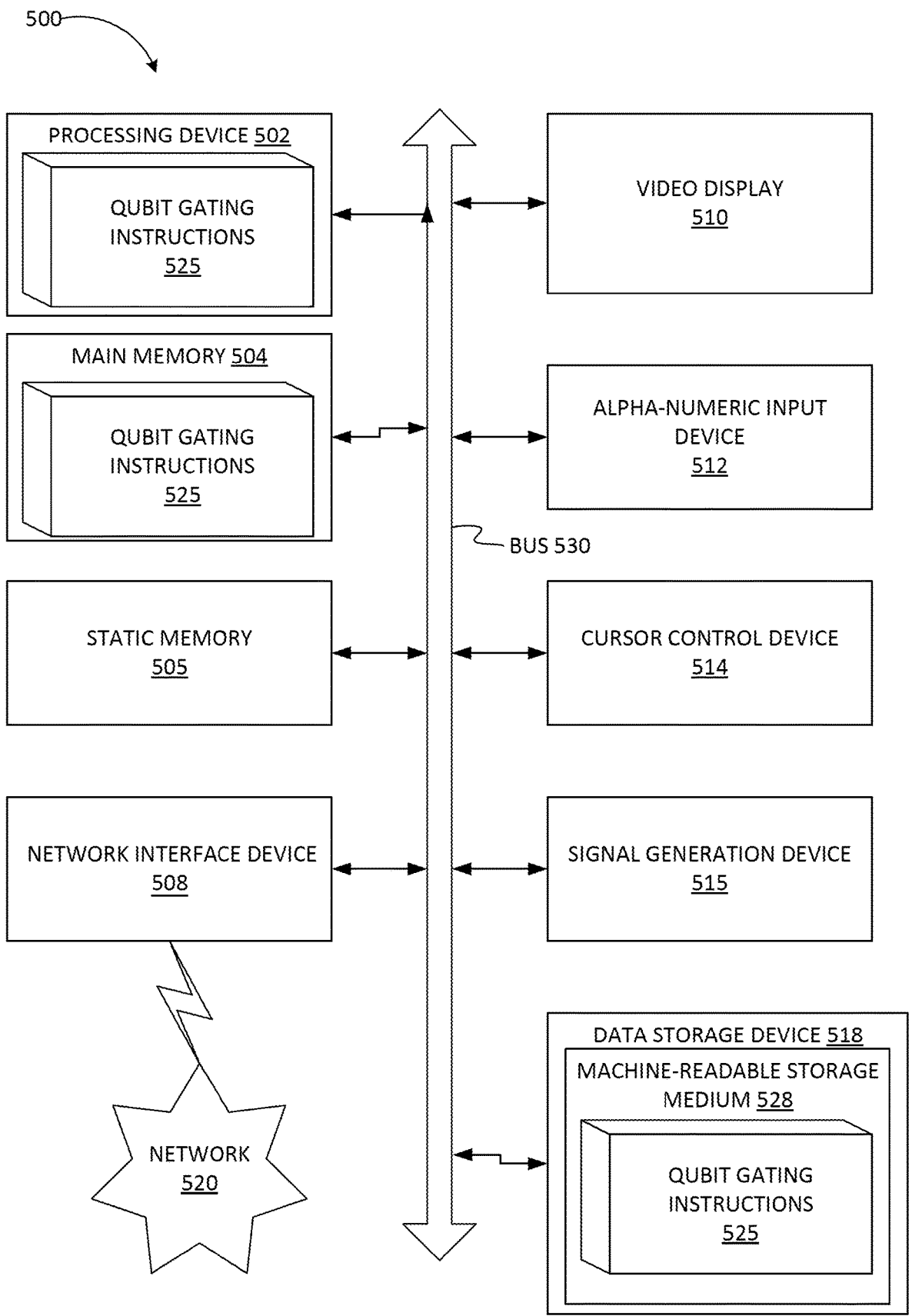
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for implementing a qubit registry that is enhanced to gate the allocation of qubits using a contract e.g., a smart contract, in accordance with some embodiments of the present disclosure.

In alternative embodiments, the computer system 500 may be connected (e.g., networked) to other machines in a local area network (LAN), an intranet, an extranet, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single computer system is illustrated, the terms "computer system" and "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute qubit gating instructions 525, for performing the operations and steps discussed herein.

The data storage device 518 may include a machine-readable storage medium 528, on which is stored one or more sets of qubit gating instructions 525 (e.g., software) embodying any one or more of the methodologies of functions described herein. The qubit gating instructions 525 may also reside, completely or at least partially, within the main memory 504 or within the processing device 502 during execution thereof by the computer system 500; the main memory 504 and the processing device 502 also constituting machine-readable storage media. The qubit gating instructions 525 may further be transmitted or received over a network 520 via the network interface device 508.

The machine-readable storage medium 528 may also be used to store instructions to implement a qubit registry that is enhanced to gate the allocation of qubits using a contract (e.g., a smart contract), as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   obtaining quantum system metadata indicating a current capability of a quantum machine comprising a plurality of qubits;
   generating, by a processing device, one or more contracts based on the quantum system metadata, wherein each of the one or more contracts include service criteria and usage restrictions;
   in response to receiving a request from a service to allocate a set of qubits of the plurality of qubits to the service, comparing the service to a first contract of the one or more contracts;
   in response to determining that the service meets service criteria of the first contract, allocating the set of qubits to the service with the usage restrictions of the first contract;
   analyzing updated quantum system metadata indicating a new current capability of the quantum machine; and
   updating the service criteria and usage restrictions of a first contract of the one or more contracts based on the updated quantum system metadata,
   wherein the service criteria of each contract of the one or more contracts comprises at least one of: a limitation on a number of qubits a particular service can request, a limitation on types of error correction software that can be used by the particular service, a limitation on a noise impact of the particular service, or a limitation on a heat impact of the particular service, and
   wherein the usage restrictions of each contract of the one or more contracts comprises at least one of: a restriction on an amount of time the requested set of qubits will be allocated to the service, a restriction on a number of times the service can be executed using the requested set of qubits, or a restriction on what quantum states each of the requested set of qubits can be put in.

2. The method of claim 1, wherein generating the one or more contracts comprises:
   generating multiple contracts, each of the multiple contracts generated based further on one or more of: a qubit material type, a service profile, and one or more error correction programs.

3. The method of claim 1, wherein the one or more contracts are generated by a qubit registry.

4. The method of claim 1, wherein the first contract is generated based further on a first qubit material type that the service is to execute on.

5. The method of claim 1, wherein the service criteria of each contract of the one or more contracts further comprises:
   a limitation on quantum phenomena that the particular service can use.

6. A system comprising:
   a memory; and
   a processing device, operatively coupled to the memory, the processing device to:
   obtain quantum system metadata indicating a current capability of a quantum machine comprising a plurality of qubits;
   generate one or more contracts based on the quantum system metadata, wherein each of the one or more contracts include service criteria and usage restrictions;
   in response to receiving a request from a service to allocate a set of qubits of the plurality of qubits to the service, compare the service to a first contract of the one or more contracts;
   in response to determining that the service meets service criteria of the first contract, allocate the set of qubits to the service with the usage restrictions of the first contract;
   analyze updated quantum system metadata indicating a new current capability of the quantum machine; and
   update the service criteria and usage restrictions of a first contract of the one or more contracts based on the updated quantum system metadata,
   wherein the service criteria of each contract of the one or more contracts comprises at least one of: a limitation on a number of qubits a particular service can request, a limitation on types of error correction software that can be used by the particular service, a limitation on a noise impact of the particular service, or a limitation on a heat impact of the particular service, and
   wherein the usage restrictions of each contract of the one or more contracts comprises at least one of: a restriction on an amount of time the requested set of qubits will be allocated to the service, a restriction on a number of times the service can be executed using the requested set of qubits, or a restriction on what quantum states each of the requested set of qubits can be put in.

7. The system of claim 6, wherein to generate the one or more contracts, the processing device is to:
   generate multiple contracts, each of the multiple contracts generated based further on one or more of: a qubit material type, a service profile, and one or more error correction programs.

8. The system of claim 6, wherein the processing device generates the one or more contracts using a qubit registry.

9. The system of claim 6, wherein the processing device generates the first contract based further on a first qubit material type that the service is to execute on.

10. The system of claim 6, wherein the service criteria of each contract of the one or more contracts further comprises: a limitation on quantum phenomena that the particular service can use.

11. A non-transitory computer-readable medium having instructions stored thereon which, when executed by a processing device, cause the processing device to:
- obtain quantum system metadata indicating a current capability of a quantum machine comprising a plurality of qubits;
- generate, by the processing device one or more contracts based on the quantum system metadata, wherein each of the one or more contracts include service criteria and usage restrictions;
- in response to receiving a request from a service to allocate a set of qubits of the plurality of qubits to the service, compare the service to a first contract of the one or more contracts;
- in response to determining that the service meets service criteria of the first contract, allocate the set of qubits to the service with the usage restrictions of the first contract;
- analyze updated quantum system metadata indicating a new current capability of the quantum machine; and
- update the service criteria and usage restrictions of a first contract of the one or more contracts based on the updated quantum system metadata,
- wherein the service criteria of each contract of the one or more contracts comprises at least one of: a limitation on a number of qubits a particular service can request, a limitation on types of error correction software that can be used by the particular service, a limitation on a noise impact of the particular service, or a limitation on a heat impact of the particular service, and
- wherein the usage restrictions of each contract of the one or more contracts comprises at least one of: a restriction on an amount of time the requested set of qubits will be allocated to the service, a restriction on a number of times the service can be executed using the requested set of qubits, or a restriction on what quantum states each of the requested set of qubits can be put in.

12. The non-transitory computer-readable medium of claim 11, wherein to generate the one or more contracts, the processing device is to:
- generate multiple contracts, each of the multiple contracts generated based further on one or more of: a qubit material type, a service profile, and one or more error correction programs.

13. The non-transitory computer-readable medium of claim 11, wherein the processing device generates the one or more contracts using a qubit registry.

14. The non-transitory computer-readable medium of claim 11, wherein the processing device generates the first contract based further on a first qubit material type that the service is to execute on.

15. The non-transitory computer-readable medium of claim 11, wherein the service criteria of each contract of the one or more contracts further comprises: a limitation on quantum phenomena that the particular service can use.

* * * * *